US012208406B2

(12) United States Patent
Chien et al.

(10) Patent No.: US 12,208,406 B2
(45) Date of Patent: Jan. 28, 2025

(54) MULTI-NOZZLE SPRAY DISK FOR AUTOMATIC MAKEUP MACHINE

(71) Applicant: GloryMakeup Inc., Taipei (TW)

(72) Inventors: Ming-Hui Chien, Taipei (TW); Wen-Hsing Chen, Taipei (TW); Daniel Ariel Donohue, Miami, FL (US)

(73) Assignee: GloryMakeup Inc., Taipei (TW)

( * ) Notice: Subject to any disclaimer, the term of this patent is extended or adjusted under 35 U.S.C. 154(b) by 310 days.

(21) Appl. No.: 17/581,149

(22) Filed: Jan. 21, 2022

(65) Prior Publication Data

US 2022/0266282 A1 Aug. 25, 2022

Related U.S. Application Data

(60) Provisional application No. 63/153,354, filed on Feb. 24, 2021.

(51) Int. Cl.

| | |
|---|---|
| ***B05B 7/24*** | (2006.01) |
| ***A45D 34/00*** | (2006.01) |
| ***B05B 7/26*** | (2006.01) |
| ***B05B 12/00*** | (2018.01) |
| ***B05B 12/14*** | (2006.01) |
| ***B05B 17/06*** | (2006.01) |

(52) U.S. Cl.

CPC .......... *B05B 12/1418* (2013.01); *A45D 34/00* (2013.01); *B05B 7/2491* (2013.01); *B05B 7/26* (2013.01); *B05B 12/004* (2013.01); *B05B 17/0607* (2013.01); *A45D 2200/057* (2013.01)

(58) Field of Classification Search

CPC ....... B05B 7/2491; B05B 261/16; B05B 1/16; B05B 1/1645; B05B 3/1057; B05B 12/04; B05B 12/004; B05B 12/1418; A45D 34/00; A45D 2200/057; A45D 2034/005; A61L 9/14; A61L 9/125

USPC ........................................................ 239/373

See application file for complete search history.

(56) References Cited

U.S. PATENT DOCUMENTS

| | | | | |
|---|---|---|---|---|
| 5,167,877 | A * | 12/1992 | Pai | A61L 9/125 261/DIG. 88 |
| 5,805,768 | A * | 9/1998 | Schwartz | A61M 15/0048 261/DIG. 65 |
| 6,713,024 | B1 * | 3/2004 | Arnell | A61L 9/125 239/57 |
| 10,888,634 | B1 * | 1/2021 | Jacobs | A61L 9/122 |
| 11,135,332 | B1 * | 10/2021 | Buckler | G07C 9/20 |

(Continued)

FOREIGN PATENT DOCUMENTS

| | | |
|---|---|---|
| CN | 113710589 A | 11/2021 |
| TW | M461353 U | 9/2013 |
| TW | 201613693 A | 4/2016 |

OTHER PUBLICATIONS

International Search Report, PCT/CN2022/102469 mailed Oct. 19, 2022.

*Primary Examiner* — Joseph A Greenlund
(74) *Attorney, Agent, or Firm* — Tong J. Lee

(57) ABSTRACT

A spray disk includes multiple nozzles at an outer perimeter of the spray disk, a center hole, and multiple partitions. The partitions are arranged around the center hole and have the center hole as an inner perimeter. Each partition includes an air inlet to receive compressed air, a liquid tank to store a liquid, and a corresponding nozzle from which to spray the liquid with the compressed air. The spray disk can be used in an automatic makeup machine.

19 Claims, 7 Drawing Sheets

(56) References Cited

U.S. PATENT DOCUMENTS

2007/0181706 A1* 8/2007 Yeh ..................... A61L 9/122
239/34
2008/0265060 A1* 10/2008 Canfield ............... B05B 7/2416
222/401
2012/0222675 A1* 9/2012 Dunne .............. A61M 15/0045
128/203.15
2013/0068788 A1* 3/2013 Gasper ................. B65D 83/386
222/144.5
2014/0158722 A1* 6/2014 Wong ................... A45D 33/025
222/630
2014/0252127 A1* 9/2014 Fedorov ................ B05B 7/2424
239/305
2017/0079409 A1* 3/2017 Delia ..................... A45D 34/00
2018/0192761 A1* 7/2018 McMahon ............. A45D 34/04
2019/0053608 A1 2/2019 Staton
2019/0160195 A1* 5/2019 Kelsen .................... A61L 9/125
2019/0192717 A1* 6/2019 Harwig ..................... A61L 9/01
2019/0336637 A1* 11/2019 Webster .................. A61L 9/042
2020/0009284 A1* 1/2020 Kihm ...................... A61L 9/122
2021/0053086 A1* 2/2021 Liu ........................ B05B 17/063
2021/0059380 A1* 3/2021 Chen ..................... B01F 27/808
2021/0060200 A1* 3/2021 Shin ........................ A61L 9/122
2021/0100923 A1* 4/2021 Gimeno Asin ..... B01F 33/8442
2021/0128773 A1* 5/2021 Nguyen .................. A61L 9/125
2021/0138101 A1* 5/2021 Nakano ................... A61L 9/125
2021/0170060 A1* 6/2021 Galvão ..................... A61L 9/14
2021/0235846 A1* 8/2021 Clappaz .................. B05B 12/14
2022/0008599 A1* 1/2022 Michelle ................... A61L 9/14
2022/0143641 A1* 5/2022 Takata ................ B05B 11/1084
2022/0266282 A1* 8/2022 Chien ................. B05B 12/1409
2023/0052182 A1* 2/2023 Jang ...................... B01F 33/841
2023/0405620 A1* 12/2023 Santoemma .......... B05B 7/2416

* cited by examiner

External Mixing

Internal Mixing

MULTI-NOZZLE SPRAY DISK FOR AUTOMATIC MAKEUP MACHINE

CROSS-REFERENCE TO RELATED APPLICATIONS

This application claims the benefit of U.S. Provisional Application No. 63/153,354 filed on Feb. 24, 2021, the entirety of which is incorporated by reference herein.

TECHNICAL FIELD

Embodiments of the invention relate to a spray disk for use in an automatic makeup machine.

BACKGROUND

Applying makeup to look one's best requires skills. To an unskilled person, the experience of applying makeup could be frustrating and the result could be far from expectation. Not everyone has the time and resources to seek help from a professional every time makeup is desired.

The advance in robotics, artificial intelligence, and control technologies brings about potential opportunities in automating cosmetics applications. For example, it has been shown that a robot can be trained to apply an eyeshadow brush to a person's face. However, for a makeup machine to be practical to a user, the machine needs to be versatile, easy to use, and safe, among other considerations.

Therefore, there is a need for an automatic makeup mechanism that can apply many types of cosmetics to a user's face.

SUMMARY

In one embodiment, a spray disk includes multiple nozzles at an outer perimeter of the spray disk, a center hole, and multiple partitions. The partitions are arranged around the center hole and have the center hole as an inner perimeter. Each partition includes an air inlet to receive compressed air, a liquid tank to store a liquid, and a corresponding nozzle from which to spray the liquid with the compressed air.

In another embodiment, a spray disk includes multiple nozzles at an outer perimeter of the spray disk, a center hole, and multiple partitions. The partitions are arranged around the center hole and have the center hole as an inner perimeter. Each partition includes an air inlet at the inner perimeter to receive compressed air, a liquid tank at a bottom portion of the partition to store a liquid, and a corresponding one of the nozzles from which to spray the liquid with the compressed air.

Other aspects and features will become apparent to those ordinarily skilled in the art upon review of the following description of specific embodiments in conjunction with the accompanying figures.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

DETAILED DESCRIPTION

Figure 1:
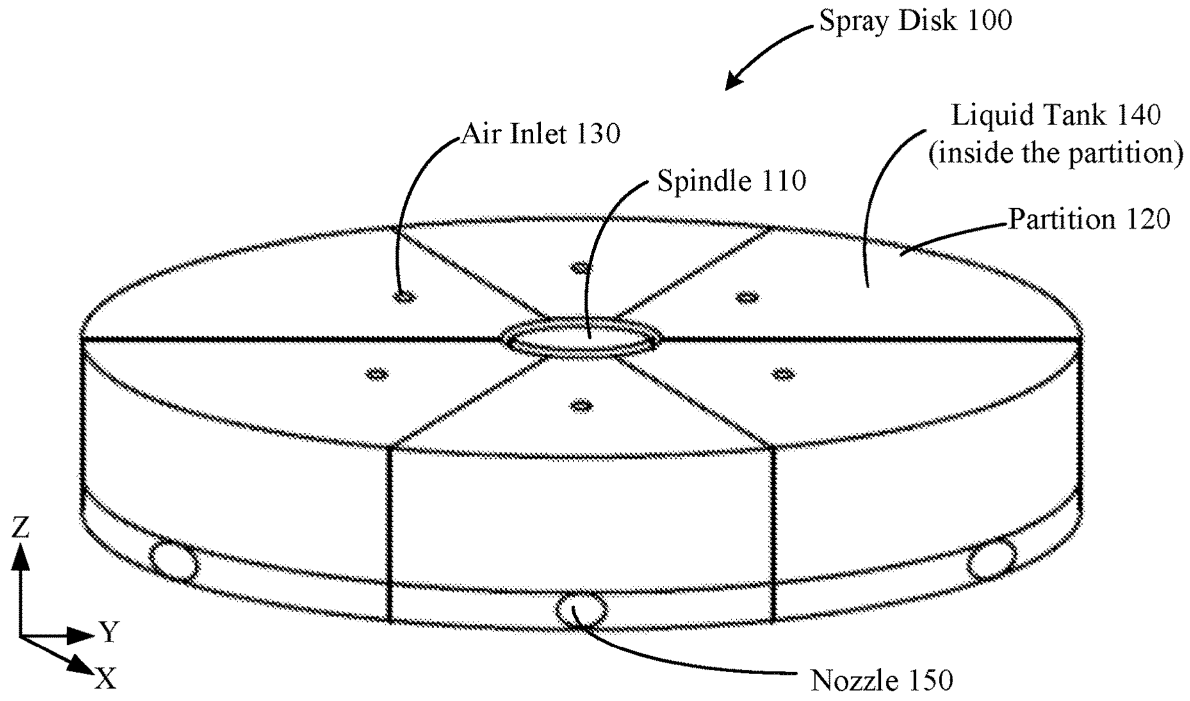
FIG. 1 illustrates a spray disk according to one embodiment.

In the following description, numerous specific details are set forth. However, it is understood that embodiments of the invention may be practiced without these specific details. In other instances, well-known circuits, structures, and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

Disclosed herein is a spray disk that may be installed in or mounted on an automatic makeup machine to spray skin products at a target area; e.g., an area on a person's skin such as a person's face. The skin products, also referred to as spray-on skin products, include cosmetics products, skincare products, pharmaceutical skin products, dermatological products, or the like. In some embodiments, the skin product may be a liquid or a liquid-like material including suspension, oil, lotion, or any materials of any viscosity that can be sprayed with compressed air. For simplicity of the following description, the skin product is hereinafter referred to as a liquid. Although the term "automatic makeup machine" is used throughout this disclosure, it is understood that the spray disk disclosed herein can be used in any automatic machine that can spray atomized liquids on a user's skin. The process of applying atomized liquids to the user's skin may be referred to as an "application session." Although the term "makeup session" is sometimes used in this disclosure, it is understood that "makeup" is a non-limiting example for the use of the disclosed spray disk and the machine that sprays the liquid contents in the spray disk.

In one embodiment, the spray disk includes multiple partitions, and each partition includes a liquid tank (also referred to as a reservoir) for storing a liquid and a nozzle for spraying the liquid. Although the following description focuses primarily on a person's face, the apparatus and method of the present invention can apply to any part of the human body. In one embodiment, the spray disk is made of plastics, resin, glass, silicone, metal, a combination of any of aforementioned materials, or a variation of any of aforementioned materials.

One type of automatic makeup machine ("machine") atomizes liquid with compressed air. The machine includes a disk head to receive and rotate the spray disk such that a selected nozzle can aim and spray at a target area. The disk head may be part of a robot or a robotic arm. In one embodiment, the disk head may be mounted on one or more guide rails and/or tracks that allow multi-dimensional movements of the disk head. The machine includes a controller to control the movements and operations of the disk head. The controller may include software and hardware executing the software.

In one embodiment, the controller directs translational and/or rotational movements of the disk head according to a 3D trajectory calculated from the user's 3D facial profile. When the disk head is suitably positioned with respect to the target area of the user's face, the controller further directs the disk head to rotate the spray disk to aim a selected nozzle at the target area. Then the machine supplies compressed air to the selected nozzle to spray the liquid in the corresponding liquid tank to the target area. Under the instructions of the controller, a sequence of partitions as well as their corresponding nozzles are selected, and in a sequence the nozzles are supplied with compressed air. The controller may further control a valve at an exit point of each liquid to control the flow of the liquid out of the partition and adjust the liquid volume being sprayed.

In one embodiment, the spray disk is for single use only. That is, the spray disk is pre-filled with liquids and is installed on the disk head at the beginning of an application session, and can be discarded when the session ends. Taking a cosmetic makeup session as an example, a cosmetic makeup session includes any combination of makeup application steps, such as applying a liquid foundation, highlights, eye shadow of one or more colors, and blush to a user's face.

In one embodiment, the spray disk may contain a single liquid tank and a single nozzle. In such an embodiment, the spray disk may be referred to as a pod and may have any shape different from a disk shape.

In one embodiment, the spray disk, the nozzles, or at least the liquid tanks of the spray disk, may be sealed in a removable film before use. For example, the top surface or the outer perimeter of the liquid tanks may be wrapped in a plastic or foil film. The film can be punctured or peeled away at the beginning of an application session to equalize the air pressure inside the liquid tank with the ambient air pressure. When the application session ends, the spray disk or at least the used liquid tank(s) can be discarded. In some other embodiments, the spray disk described herein may be used multiple times; i.e., for multiple application sessions.

FIG. 1 illustrates a spray disk 100 according to one embodiment. The spray disk 100 includes multiple partitions 120. Within each partition 120, there is a liquid tank 140 that stores a liquid. At the outer perimeter of each partition 120, there is a nozzle 150 for spraying the liquid. In this example, both the top and the bottom of the spray disk 100 are aligned with an X-Y plane (i.e., the horizontal plane). It is noted that the terms "top" and "bottom" described herein refer to views shown in the figures, when in use the disclosed spray disk and its partitions may be installed in a different orientation from what is shown; e.g., with the top side down. An example of a top-side-down orientation is described later with reference to FIG. 4.

The spray disk 100 has an outer perimeter that is circular or substantially circular; e.g., the shape of a cylindrical disk. Multiple partitions 120 are disposed around a rotational spindle 110. The rotational spindle 110 is aligned with a center axis (i.e., the Z-axis, also referred to as the vertical axis). Although six partitions 120 are shown in this example, it is understood that the spray disk 100 may contain any number of partitions 120. Each partition 120 extends radially from the rotational spindle 110 to the outer perimeter of the spray disk 100. Each partition 120 includes a corresponding nozzle 150 at the outer perimeter of the spray disk 100. More specifically, the nozzles are disposed around the side surface at the outer perimeter of the spray disk 100.

The spindle 110 is driven by a motor in the machine to rotate the spray disk 100 about the Z-axis, such that a selected nozzle can aim at the target area. The spindle 110 extends axially along the center axis (i.e., the Z-axis) of the spray disk 100 and rotates the spray disk 100 on the horizontal plane. The spindle 110 may be part of the spray disk 100 and can be mounted on the disk head of an automatic makeup machine. In an alternative embodiment, the spindle 110 may be part of the disk head or part of the machine; that is, the spray disk 100 may include a center hole to enable insertion into the spindle 110.

In this embodiment, each partition 120 includes an air inlet 130 to allow the passage of compressed air. An air compressor in the machine delivers the compressed air to a selected air inlet 130 via an air needle or tube. A hollow passage, referred to as an air channel, extends from the air inlet 130 through the partition 120 to reach the corresponding nozzle 150. When the compressed air is injected into an air inlet 130, the liquid in the liquid tank 140 of the selected partition 120 is atomized by the air and sprayed out from the corresponding nozzle 150.

Figure 2:
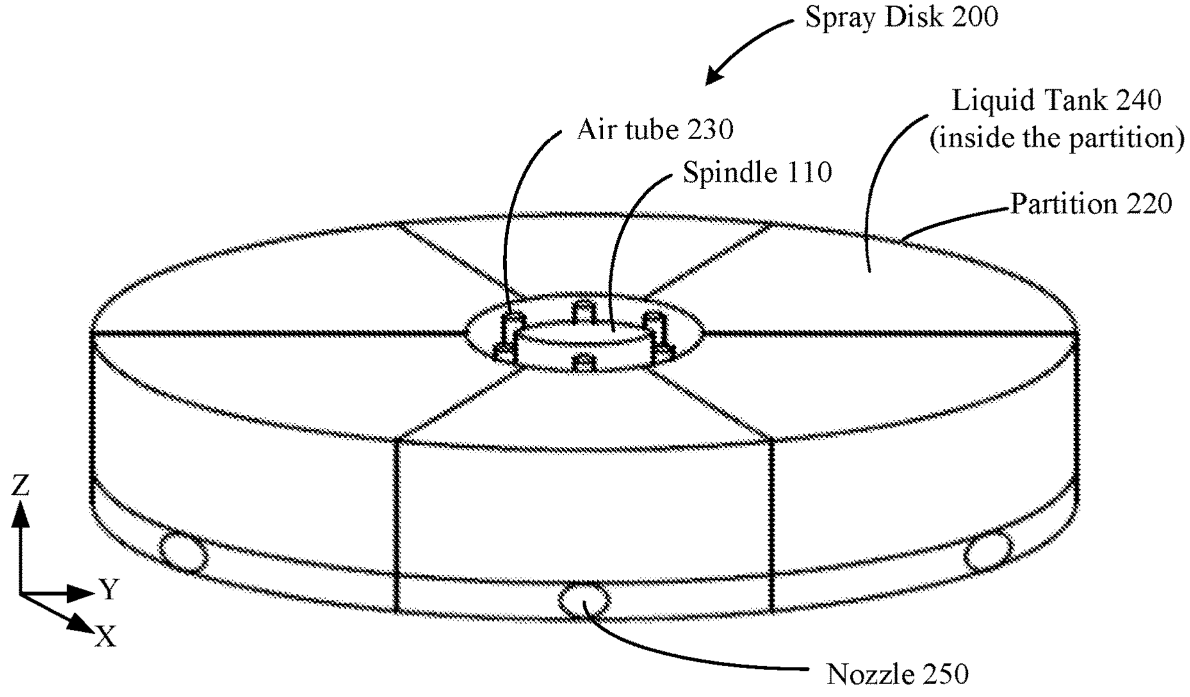
FIG. 2 illustrates a spray disk according to another embodiment.

FIG. 2 illustrates a spray disk 200 according to an alternative embodiment. The spray disk 200 includes multiple partitions 220, and each partition 220 includes a liquid tank 240 to store a liquid and a nozzle 250 for spraying the liquid. The spray disk 200 has the same shape as the spray disk 100 in FIG. 1, except that the compressed air is delivered through the air tubes 230 (which are visible from the top view shown in FIG. 2) to enter air inlets (not shown) of selected partitions 220. The air tubes 230 may be part of the machine, the disk head, or the spray disk 200. In this example, the air inlets may be positioned at the inner perimeter of the partitions. Compressed air may enter a partition 220 through the air inlet, pass through an air channel, and exit from a corresponding nozzle 250 with an atomized liquid.

In other alternative embodiments, the position of the air inlet may be anywhere on any surface of the partition (top, bottom, or inner perimeter). It is understood that the compressed air may be delivered to the air inlet of each partition via alternative mechanisms; the examples illustrated in FIG. 1 and FIG. 2 are non-limiting. Furthermore, the nozzle of each partition may be anywhere on the outer perimeter of the partition. Similar to the spray disk 100 in FIG. 1, in use the disclosed spray disk and its partitions may be installed in a different orientation from what is shown; e.g., with the top side down. An example of a top-side-down orientation is described later with reference to FIG. 4.

In one embodiment, the spray disks described herein may have a diameter of a few centimeters (e.g., 4-6 cm) and thickness of a few centimeters (e.g., 1.5-2.0 cm), although a spray disk of a different size may also be used.

In one embodiment, a spray disk may include more than one layer of partitions. For example, the spray disk 100 may be stacked on top of the spray disk 200 along the Z-axis direction. Alternatively, the spray disk 100 or 200 may be stacked back to back. Both spray disks 100 and 200 may receive compressed air from their respective air inlets reachable by an air needle from the top, bottom, inner perimeter, or from another surface. An automatic makeup machine may include more than one air needle to concurrently deliver compressed air to more than one nozzle. In another embodiment, a spray disk may include more than two layers of partitions. The air inlets for each partition may be located anywhere reachable by an air needle or tube. The stacking of layers of partitions enables concurrent spraying of multiple liquids at a user to shorten the time duration of an application session. In one embodiment, each of the stacked spray disks may be rotated or moved independently of one another.

In one embodiment, the central axis (e.g., the spindle 110) of a spray disk may be horizontally oriented towards the target area such that the spray disk rotates like a Ferris wheel. That is, all of the nozzles of the spray disk are disposed on the front side (i.e., the user-facing side) of the spray disk, and the compressed air may be supplied to the partitions from the front side, the backside, or inner perimeter of the partitions. In this embodiment, more than one partition can be selected to spray liquids at the same time.

In one embodiment, each partition in a spray disk has the same size and shape. In some embodiments, the partitions may have different sizes and/or shapes. For example, some partitions may be larger than others to contain larger liquid tanks for more liquids. In one embodiment, all of the partitions have the same size but some partitions may have larger liquid tanks than others. Moreover, the partitions may have different shapes from the examples in FIGS. 1 and 2, and the partitions may have different shapes from one another.

In one embodiment, each nozzle of a spray disk has the same size and shape. In some embodiments, the nozzles of a spray disk may have different sizes and/or shapes to produce different spraying patterns. For liquid liquids, the viscosity of the liquids may be a factor in determining the nozzle sizes.

In some embodiments, the outer perimeter of a spray disk may have a shape different from a circle. For example, the perimeter of a spray disk may have the shape of a rectangle, a square, an ellipse, a polygon, scallop-shaped, or any geometric shape. Likewise, each partition in a spray disk may have any geometric shape, and the partitions may be arranged in any geometric configuration.

Figure 3:
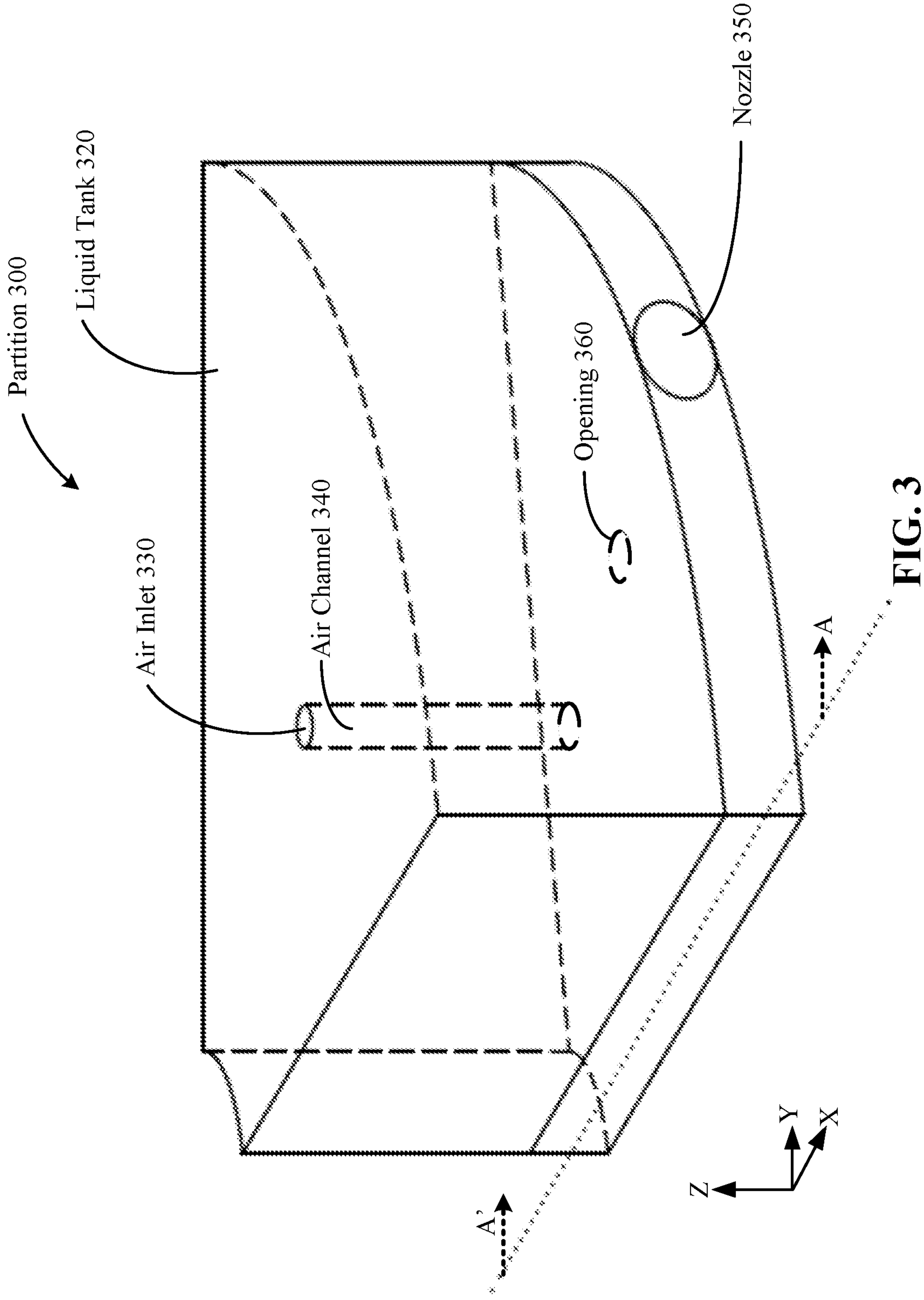
FIG. 3 illustrates a partition of a spray disk according to one embodiment.

FIG. 3 illustrates a partition 300 of a spray disk according to one embodiment. The interior elements of the partition 300 are shown in dashed lines. The partition 300 may be any of the partitions in a spray disk described herein. The shape of the partition 300 is illustrated as an example; it is understood that a partition described herein may have a different three-dimensional shape from what is shown. The partition 300 has an air inlet 330 on a surface (e.g., the top surface in the view) and an air channel 340 that connects the air inlet 330 to a nozzle 350. In an alternative embodiment, the air inlet 330 may be located on the bottom surface or the inner perimeter of the partition 300. The top portion of the partition 300 is a liquid tank 320 that contains a liquid. The bottom of the liquid tank 320 has an opening 360 from which the contained liquid flows out to the nozzle 350 via a liquid channel disposed in a lower portion of the partition 300. In some embodiments, the partition 300 when in use may be placed with the top surface up, or the top surface down.

In one embodiment, a surface area of the partition 300 may be punctured at the beginning of an application session to equalize the air pressure inside the liquid tank 320 with the ambient air pressure. Alternatively, the surface area of the partition 300 may contain a needle-sized air hole that connects to the liquid tank 320 inside the partition. The air hole may be covered by a film or foil. At the beginning of an application session, the film or foil can be removed to expose the air hole.

Figure 4:
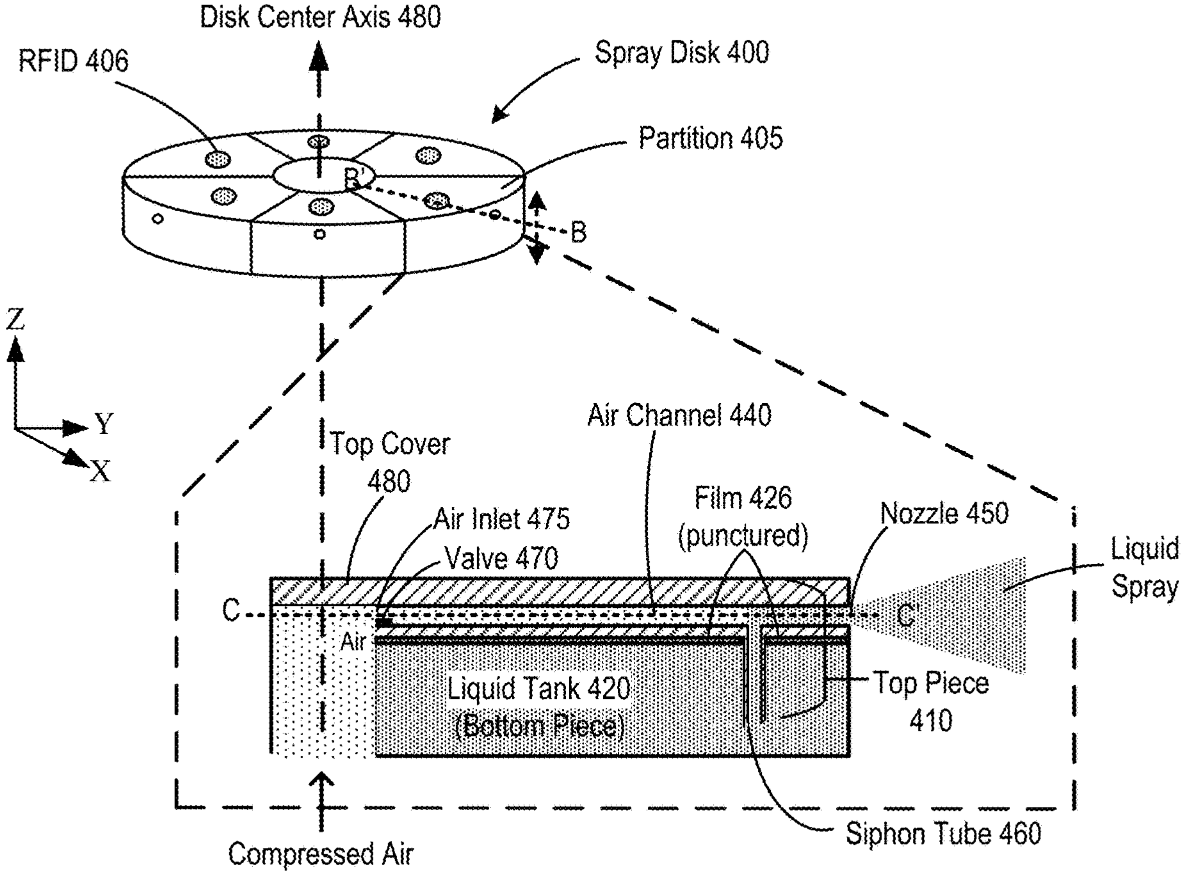
FIG. 4 is a schematic diagram illustrating a siphon-type spray disk according to one embodiment.

FIG. 4 is a schematic diagram illustrating a siphon-type spray disk 400 (referred to as the spray disk 400) according to one embodiment. The spray disk 400 includes multiple partitions 405, one of which is shown in the dashed-line area. The spray disk 400 may include one or more partitions, the number of partitions shown in FIG. 4 is a non-limiting example. FIG. 4 shows the cross-section view of the partition 405 on a vertical plane that cuts along the Z-direction across the B-B' line. The partition 405 includes a liquid tank 420 located at the bottom and an air channel 440 that passes compressed air over the top of the liquid tank 420. A siphon tube 460 that connects to the air channel 440 is inserted into the liquid tank 420. The air channel 440 receives compressed air from a passageway that extends through a disk center axis 480 (i.e., the Z-direction). The liquid in the liquid tank 420 is siphoned upwards into the air channel 440 when the compressed air passes through. The compressed air is mixed with the liquid in the air channel 440 and forces the liquid out of a nozzle 450 to form a liquid spray. In one embodiment, a valve 470 is positioned at the inlet (i.e., an air inlet 475) of the air channel 440, where the valve 470 can open and close to control the in-flow of the compressed air. In the example of FIG. 4, the air inlet 475 is located at the inner perimeter of the partition 405.

In one embodiment, the spray disk 400 is formed by a top piece and a bottom piece. The top piece includes a top cover of the spray disk 400 and includes air channels and corresponding siphon tubes and nozzles. The air channels provide compressed air to the corresponding nozzles of corresponding partitions. The bottom piece includes liquid tanks of the corresponding partitions. Before use, a user may place the top piece on top of the bottom piece to form the spray disk 400. In one embodiment, the top surface of the bottom piece (i.e., the liquid tanks) may be wrapped in or covered by a plastic or foil film. The film can be punctured or peeled away at the beginning of an application session.

FIG. 4 shows a top piece 410 and a bottom piece (i.e., the liquid tank 420) that belong to the partition 405. The top piece 410 includes a top surface 480, the air channel 440, the siphon tube 460, the air inlet 475, and the valve 470. The bottom piece includes the liquid tank 420. The siphon tube 460 may have a sharp tip at the bottom end. When the top piece 410 is placed on the liquid tank 420, the siphon tube 460 can puncture a film 426 on the top surface of the liquid tank 420 and insert into the liquid tank 420. For a spray disk of K partitions, the corresponding K siphon tubes on the top piece can be used to simultaneously puncture the K liquid tanks. FIG. 4 also shows that the top surface of each partition includes a machine-readable identifying code (e.g., a Radio Frequency Identification (RFID) 406, which is described in detail with reference to FIG. 8.

In an alternative embodiment, the spray disk 400 may include a single partition, which is also referred to as a pod. The pod includes a single liquid tank and a single nozzle for spraying an atomized liquid on a user's skin. Similar to the embodiment of FIG. 4, the pod may include a top piece and a bottom piece. In an alternative embodiment, the pod may have a shape different from a disk.

Figure 5:
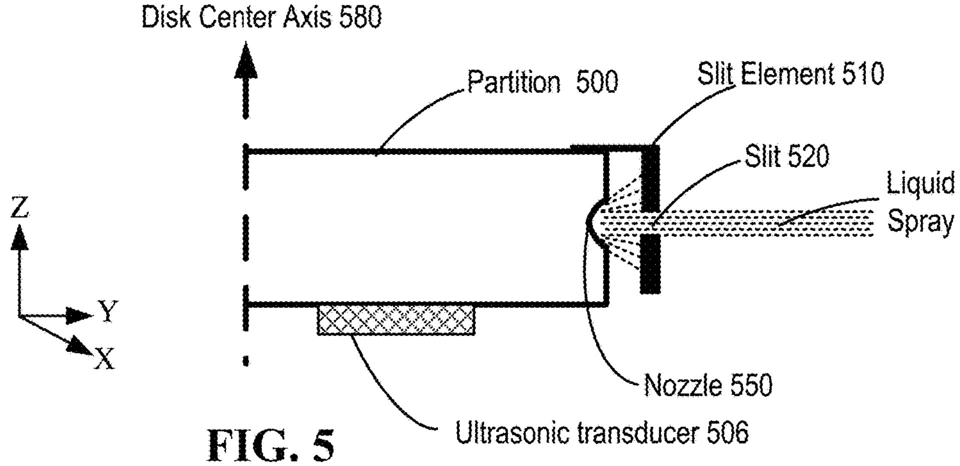
FIG. 5 is a schematic diagram illustrating a slit element according to one embodiment.

FIG. 5 is a schematic diagram illustrating a slit element 510 according to one embodiment. A partition 500 may be any of the aforementioned partitions (e.g., partition 300 in FIG. 3 or partition 405 in FIG. 4) with an additional component, the slit element 510. The slit element 510 includes a slit 520 along the X direction, which is the direction that goes into the page as viewed. A disk center axis 580 (i.e., the Z-axis) is shown as a reference. The slit 520 is positioned in front of a nozzle 550 and may have the shape of a straight line, an arch-shaped curve, or another shape. The slit element 510 may be attached to or integrated as part of the partition 500. As an example, the partition 500 may contain eyeliner liquid (not shown) and the slit 520 may be shaped like the contour of an eye. The use of the slit 520 allows the liquid spray to form a desired pattern on the target area. In one embodiment, an ultrasonic transducer 506 is attached to the bottom surface of the spray disk, for example, the bottom surface of the partition 500. The ultrasonic transducer 506 is operative to vibrate the spray disk to prevent clogging and sedimentation of the liquids.

Referring to FIGS. 1-4, a partition of any of the aforementioned spray disks may be a modularized partitions (also referred to as a modularized lobes) that can be mixed and matched with other modularized partitions by users to form a customized spray disk. Each modularized partition is separable from other partitions of the spray disk and is individually removable from the spray disk.

A spray disk with modularized partitions is referred to as a modularized spray disk. Any of the spray disk 100 (FIG. 1), 200 (FIG. 2), and/or 400 may be a modularized spray disk. A modularized spray disk may have a circular or substantially circular shape. A modularized spray disk includes multiple modularized partitions. The modularized partitions can be placed together on a disk frame (e.g., a tray) to form a spray disk. The disk frame may be part of the spray disk or the disk head. The disk frame may be single-use (e.g., made of plastic) or multi-use (e.g., made of metal).

In one embodiment, a user may customize a spray disk by mixing and matching different partitions containing different liquids according to the user's preference. A user may purchase the modularized partitions individually and assemble them into a customized spray disk. The modularized partitions and the liquids contained therein may be manufactured by different manufacturers and marketed under different brands.

Figure 6A:
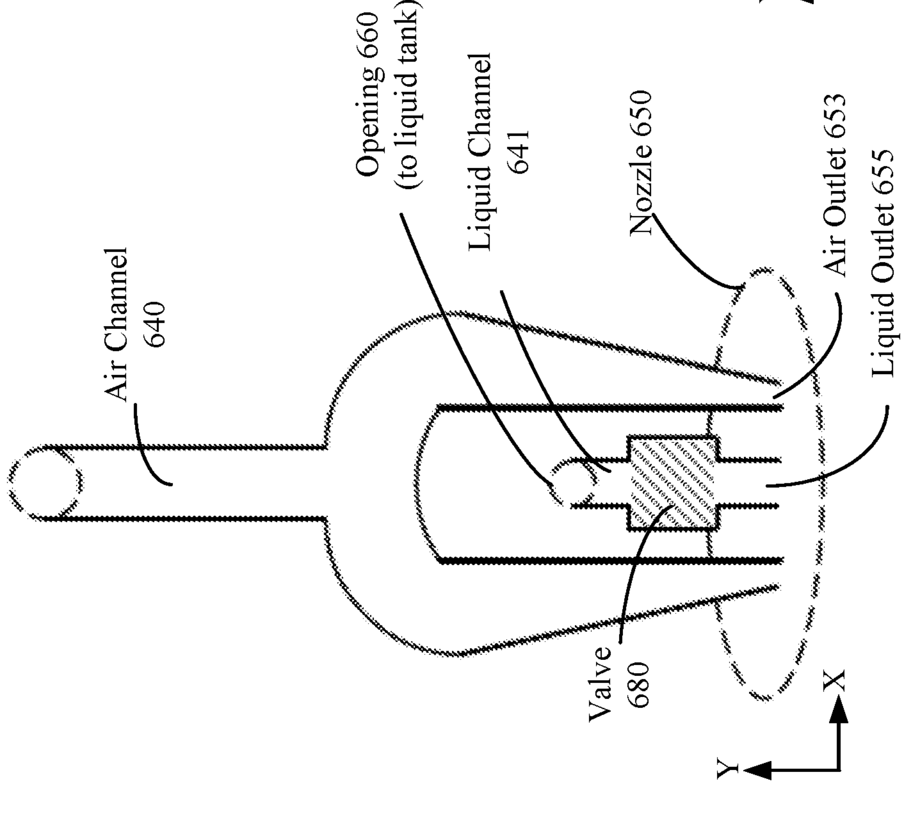
FIG. 6A illustrates a schematic diagram of external mixing according to one embodiment.
Figure 6B:
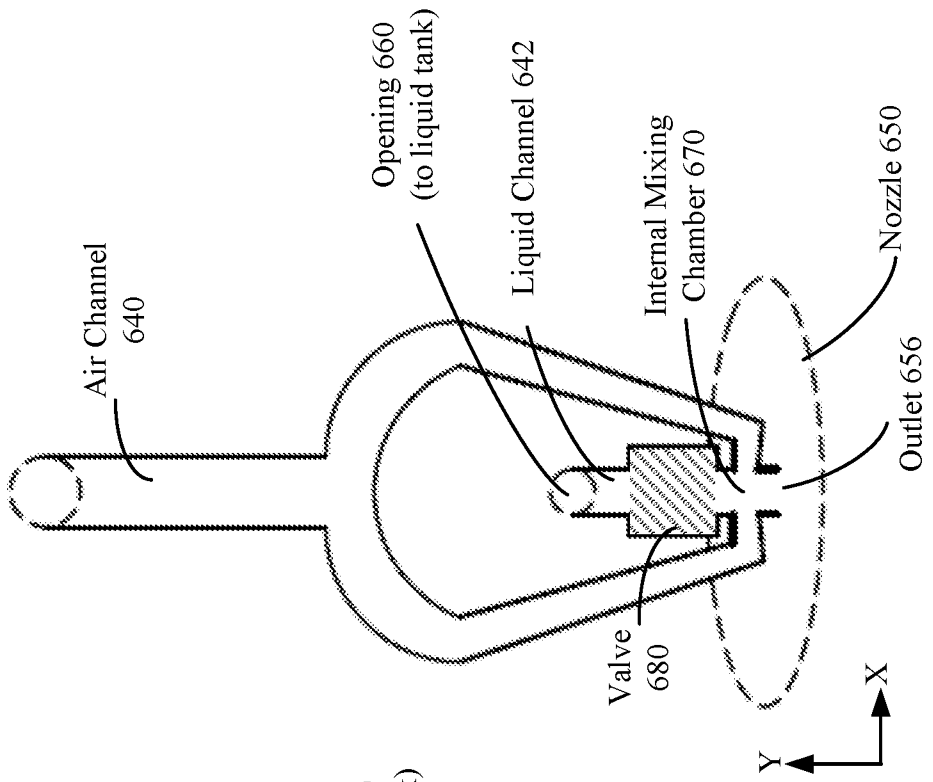
FIG. 6B illustrates a schematic diagram of internal mixing according to one embodiment.

FIG. 6A and FIG. 6B illustrate two examples of atomizing a liquid. The atomization takes place at a nozzle 650, which may be any of the aforementioned nozzles. Using FIG. 3 as an example, FIGS. 6A and 6B show the top view of the plane that cuts across the A-A' line and spans in parallel with the X-Y plane. Using FIG. 4 as an example, FIGS. 6A and 6B show the top view of the plane that cuts across the C-C' line and spans in parallel with the X-Y plane. The air channel, the liquid channel, the nozzle, and the outlets are not drawn to scale. It is understood that this disclosure covers embodiments of the air channel and the liquid channel that have different relative lengths, widths, shapes, curvatures, and/or angles from what is shown in these figures.

FIG. 6A illustrates a schematic diagram of external mixing according to one embodiment. An opening 660 leads to the liquid tank. A liquid channel 641 connects the opening 660 to a liquid outlet 655. In this external mixing embodiment, the liquid channel 641 extends radially to the liquid outlet 655 at the outer perimeter of the spray disk to deliver a liquid to the nozzle 650. In one embodiment, the liquid channel 641 may be coupled to a valve 680 to control the volume of the liquid flowing out to the nozzle 650. Non-limiting examples of the valve 680 will be provided later with reference to FIGS. 7A and 7B. In another embodiment, the compressed air pressure may be adjusted to control the spray volume of the liquid.

In the embodiment of FIG. 6A, the air channel 640 splits or branches into two (or more) sub-channels before reaching the outer perimeter of the spray disk. Each sub-channel extends to an air outlet 653 at the outer perimeter to deliver pressured air to the nozzle 650. The air outlets 653 may be arranged or positioned on opposite sides of the liquid outlet 655. In an alternative embodiment where the air channel 640 splits into more than two sub-channels, the air outlets 653 may surround the liquid outlet 655. Thus, the nozzle 650 in the external mixing embodiment is formed by multiple outlets including the liquid outlet 655 and two or more air outlets 653. The air flowing out of the air outlets 653 creates a low-pressure zone near the liquid outlet 655 and draws out the liquid from the corresponding liquid tank.

FIG. 6B illustrates a schematic diagram of internal mixing according to one embodiment. In this internal mixing embodiment, the sub-channels of the air channel 640 join the liquid channel 642 in an internal mixing chamber 670, where the liquid is mixed with compressed air. Then the mixture exits from a single outlet 656. Thus, the nozzle 650 in the internal mixing embodiment is formed by this single outlet 656 only. The nozzle 650 in this embodiment may be the same as the outlet 656. The air channel 640 may split into two or more sub-channels before reaching the internal mixing chamber 670. Similar to FIG. 6A, a liquid channel 642 carrying a liquid from a corresponding liquid tank may be coupled to the valve 680 to control the volume of the liquid flowing out to the corresponding nozzle 650. The details of the valve 680 will be described later with reference to FIGS. 7A and 7B. In another embodiment, the compressed air pressure may be adjusted to control the spray volume of the liquid.

It is noted that the liquid channels 641, 642, and the air channel 640 may have any cross-sectional shapes, and the cross-sectional area of each channel may change (e.g., tapered) towards the nozzle 650. The air channel 640 may split into sub-channels at a different point than the examples in FIGS. 6A and 6B.

Figure 7B:
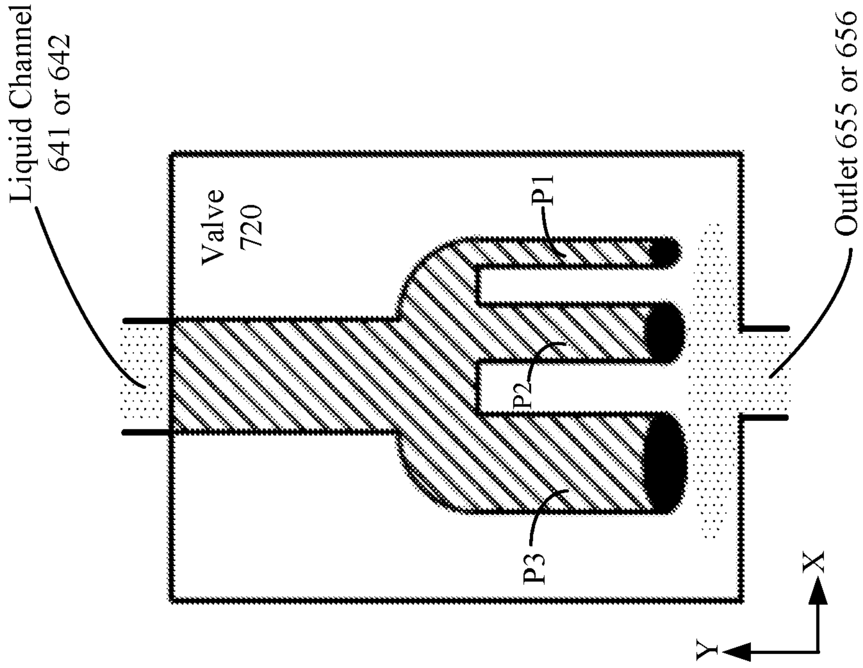
FIG. 7B illustrates a planer view of a valve that controls the liquid flow according to another embodiment.
Figure 7A:
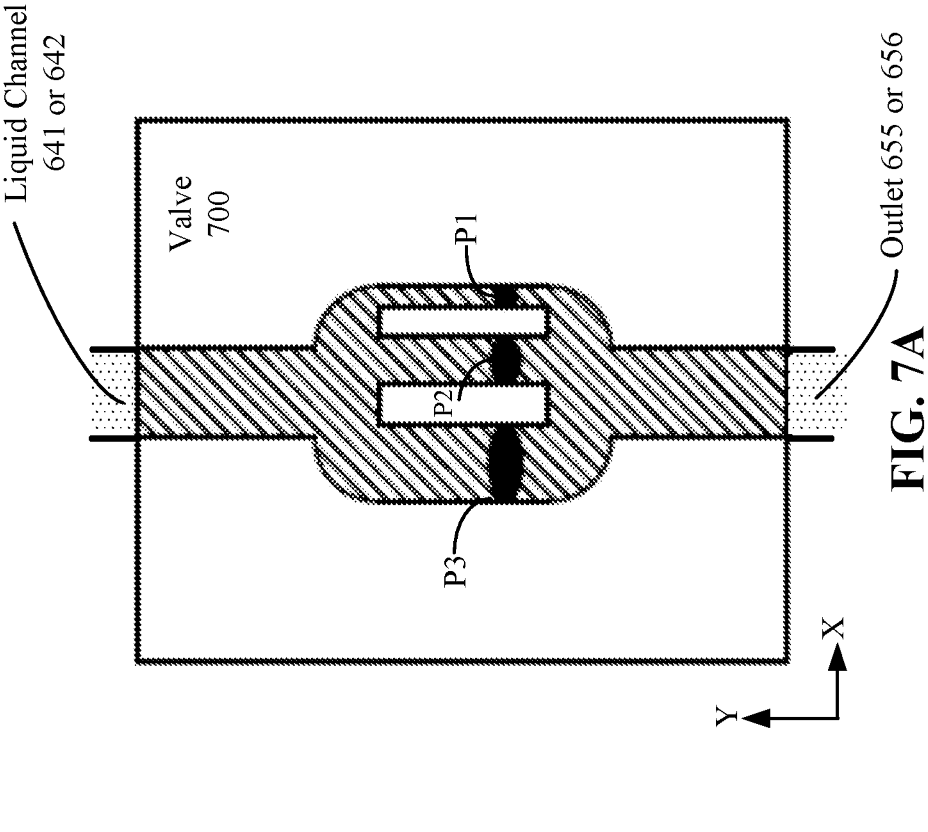
FIG. 7A illustrates a planer view of a valve that controls the liquid flow according to one embodiment.

FIGS. 7A and 7B illustrate a planer view of a valve 700 and a valve 720, respectively, according to some embodiments. Referring also to FIG. 6A and FIG. 6B, the valve 700 and the valve 720 may be examples of the valve 680, which is used to control the volume of the liquid flowing out to the corresponding nozzle 650. The liquid channel 641 or 642 enters the valve 700 or 720 and splits into a number of paths, such as three paths (P1, P2, and P3) with different cross-sectional sizes, where the size may be width, diameter, diagonal length, depth, area, or another measurement. For example, the ratios of the cross-sectional sizes of the three paths may be 1:2:4, and each of these three paths can be individually controlled to open and close independently of the others. As an example, each path may be coupled to a needle or rod-shaped element that can move vertically upward (to open) and downward (to close). Depending on the amount (i.e., flow volume) of the liquid needed, the automatic makeup machine (more specifically, the controller in the machine) can determine a combination of opening and closing the paths to select one of the eight combinations provided by the three paths. In the embodiment of FIG. 7A, the three paths rejoin into one channel before exiting the valve 500. In the embodiment of FIG. 7B, the three paths do not rejoin into one channel before exiting the valve 520.

It should be understood that the liquid channel 641 or 642 may split into any number of paths in the valve 680 (FIG. 6A and FIG. 6B). In one embodiment, the liquid channel 641 or 642 in the valve 680 may split into multiple (e.g., N) paths with binary-coded cross-sectional sizes. More specifically, the cross-sectional size of path k (i.e., $P_k$) equals $c \cdot 2^k$, where c is a constant and k is an index from 0 to (N−1). The amount of liquid flowing through $P_k$ is directly proportional to the cross-sectional size of $P_k$, which in turn is directly proportional to $2^k$. Thus, an open path represents $2^k$, a closed path represents 0, and the sum of the numbers represented by these paths corresponds to the total amount of the liquid that can flow through the valve. The binary-coded path sizes allow the machine to control the output volume of a selected liquid in the range from 0 to $(2^N-1)$ volume units, with a step size of one volume unit. The valve 680 in each partition of the spray disk may be controlled independently of the other valves.

To control the mixing ratio of air to a selected liquid, the air compressor may adjust both the airflow speed and the amount of air delivered to a corresponding nozzle. Moreover, a controller in the machine may adjust the output volume of the selected liquid by controlling the opening or closing of each path in the corresponding valve.

Figure 8:
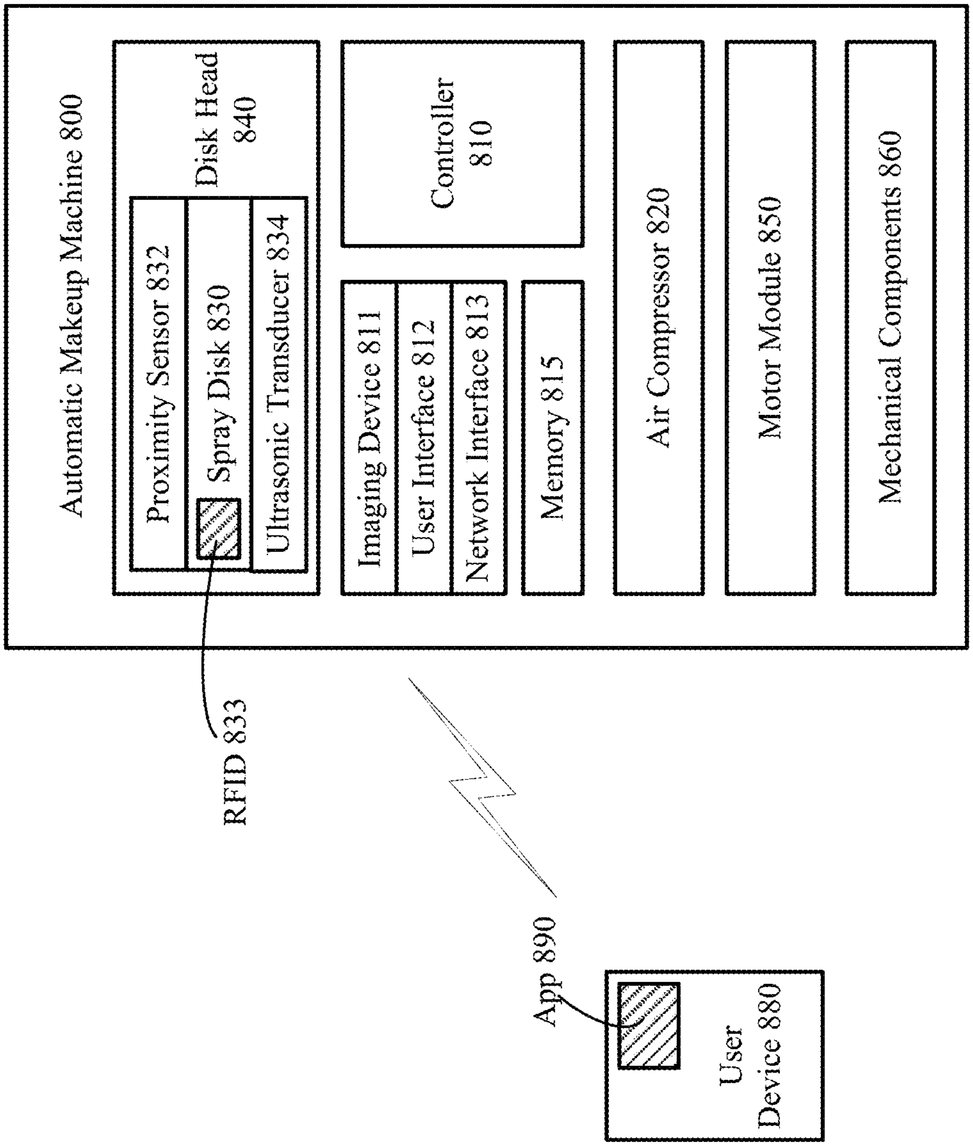
FIG. 8 is a diagram illustrating an automatic makeup machine according to one embodiment.

FIG. 8 is a block diagram illustrating an automatic makeup machine 800 ("the machine 800") according to one embodiment. It is understood the embodiment of FIG. 8 is simplified for illustration purposes. Additional hardware components may be included. The machine 800 includes a disk head 840 in which a spray disk 830 (such as any of the aforementioned spray disks) may be installed and may be removed after use. The machine 800 includes a controller 810, which may further include processing hardware such as one or more general-purpose processors, special-purpose circuits, or a combination of both. The controller 810 is coupled to a memory 815. The memory 815 may include dynamic random access memory (DRAM), SRAM, flash memory, and other non-transitory machine-readable storage media; e.g., volatile or non-volatile memory devices. In one embodiment, the memory 815 may store instructions which, when executed by the processing hardware, cause the processing hardware to control the automatic makeup operations of the machine 800, as well as the movements and spraying actions of the spray disk 830. The controller 810 may automatically control the air pump valve or air pump to output the air volume needed for the optimal performance to control the flow of liquid to the nozzle(s).

The machine 800 includes a motor module 850, which further includes a number of motors. Under the control of the controller 810, the motor module 850 enables the movements of the disk head 840 and the rotation of the spray disk 830. Although FIG. 8 shows the motor module 850 as a single block, it is understood that the motor module 850 may include multiple motors located at multiple locations in the machine 800 for controlling different movements of the disk head 840 and the spray disk 830. The machine 800 further includes an air compressor 820 to supply compressed air to the spray disk 830 under the command of the controller 810. The machine 800 further includes mechanical components 860 such as robotic components to move the disk head 840 under the command of the controller 810.

In one embodiment, the machine 800 further includes an imaging device 811 (e.g., one or more cameras), which can capture a 3D profile of the target area, such as a user's 3D facial image. From the 3D profile, the controller 810 can determine a sequence of positions and orientations of the disk head 840 to apply or spray liquids from the spray disk 830, and instruct the motor module 850 to move the disk head 840 according to the sequence of positions and orientations. The imaging device 811 can also be used to monitor the liquid application process (e.g., a makeup process). The controller 810 may use the information from the cameras to ensure safety and proper usage of the machine 800. In one embodiment, the spray disk 830 or the disk head 840 may be marked with a number of fiduciary markings. One or more disk-facing cameras may be installed on the part of the machine 800 that faces the disk head 840, such that during an application session the disk-facing cameras can continuously monitor the locations and orientations of the spray disk 830 based on the fiduciary markings. One or more user-facing cameras may monitor the location and orientation of the user's face. From the monitored data, the controller 810 can determine the distance and angle between the spray disk 830 and the user's face to further determine whether it is safe to apply makeup to the face.

In one embodiment, a proximity sensor 832 may be attached or coupled to the spray disk 830 or the disk head 840 for detecting the presence of a nearby user (e.g., when a user's face is within a predetermined range or distance). Based on information from the proximity sensor 832, the machine 800 may generate a warning and/or pause any movement when the detected distance between the target area (e.g., a user's face) and the spray disk 830 is below a threshold. The machine operation may resume when the distance increases above the threshold. The use of the proximity sensor 832 can avoid unintentional collisions between machine components and the user to thereby protect the user. As a non-limiting example, a proximity sensor manufactured by Omron Industrial Automation (ia.omron.com) may be used.

In one embodiment, the spray disk 830 is attached to an ultrasonic transducer 834, also referred to as an ultrasonic oscillator. The ultrasonic transducer 834 may be part of the spray disk 830, attached to the bottom of the spray disk 830, or part of the disk head 840. When the machine 800 is in operation, the ultrasonic transducer 834 vibrates the spray disk 830 to prevent clogging and sedimentation of the liquids. Alternatively or additionally, the ultrasonic transducer 834 may shake and/or rotate the spray disk 830 before an application session to homogenize the liquids. As a non-limiting example, an ultrasonic transducer (a.k.a. miniature ultrasonic motor-driven rotary stage) manufactured by PI USA (pi-usa.us) may be used.

In one embodiment, the machine 800 may include a user interface 812 such as a graphical user interface (GUI), through which the controller 810 can communicate with the user; e.g., regarding the makeup process and color options, and guide the user through the makeup process. The controller 810 may execute control software stored in the memory 815 on the machine 800 to perform such control operations. In one embodiment, the machine 800 may also include a network interface 813 to connect to a wired and/or wireless network for transmitting and/or receiving voice, digital data, and/or media signals. For example, the machine 800 may communicate with a user device 880 via the network interface 813. A user may download an app 890 to the user device 880, which may be a computing and/or communication device such as a smartphone, a wearable device, a portable device, a computer, etc. The app 890 may provide the user with many different makeup templates including makeup styles, colors, facial areas, etc., and the user may select a combination of these choices. The app 890 forwards the information from the user to the controller 810 of the machine 800 at a setup stage or at the beginning of an application session for the user.

In one embodiment, the app 890 can simulate the makeup result of applying a chosen makeup template with a chosen spray disk to a user's face, regardless of whether or not the chosen spray disk is loaded on the machine 800. For example, a user can scan or otherwise enter a code printed on the chosen spray disk into the user device 880, and the app 890 generates a number of makeup results based on the liquids contained in the chosen spray disk. The user device 880 can display the simulated makeup results for the user to preview.

A code such as a barcode, a QR code, an RFID 833, or another machine-readable identifying code, may be printed on the spray disk 830 to specify a set of liquids contained therein. This set of liquids may be used for a makeup type or makeup template. The machine 800 reads the code and performs error-checking. Based on the code, the machine 800 can determine and inform the user whether he/she loads the correct spray disk into the machine 800; e.g., whether the spray disk 830 can be used for a cosmetic template selected by the user. The error-checking of the code can also be performed for security purposes; e.g., to prevent counterfeiting.

In an embodiment where the spray disk 830 is a modularized spray disk, each partition of the modularized spray disk may have a machine-readable identifying code (e.g., a barcode, a QR code, an RFID, etc.) printed on the surface to identify the liquid stored in that partition. An example of the machine-readable identifying code printed on the top surface of each partition is shown in FIG. 4 as the RFID 406. The machine 800 can check the code of each partition in the modularized spray disk to determine and inform the user whether he/she assemble the correct partitions into the modularized spray disk for the selected makeup template. The code on each partition can also be used for security purposes; e.g., to prevent counterfeiting.

The following description provides further details of the controller's 810 (FIG. 8) operations. During an application session, the controller 810 instructs the motor module 850 to move the disk head 840 along a 3D trajectory to position the spray disk 830 at an appropriate distance and angle to the target area (e.g., a user's face). The distance and angle may be determined based on 3D imaging of the face. The controller 810 instructs the motor module 850 to rotate the spray disk 830 about the central axis (which aligns with the Z-axis) to aim a selected nozzle at the face. A sequence of disk head movements and spray disk rotations may be determined based on a pre-selected makeup template (i.e., makeup pattern). For example, a pre-selected makeup template of a gala style may include foundation, highlight, eyeshadow of two colors, and blush. Accordingly, the controller 810 determines an order of activation (nozzles A-B-C-D-E in that order) and the flow volume of each liquid tank. The controller 810 instructs the motor module 850 to move the disk head 840 in front of target areas of the face according to the 3D facial image, and to rotate the spray disk 830 by pre-determined angles. For example, when a foundation is selected, the spray disk 830 is rotated such that the selected partition containing the foundation faces the user and the corresponding nozzle aims at target areas of the user's face. The air compressor 820 injects compressed air into the air inlet of the selected partition to spray the foundation to the user's face.

Figure 9:
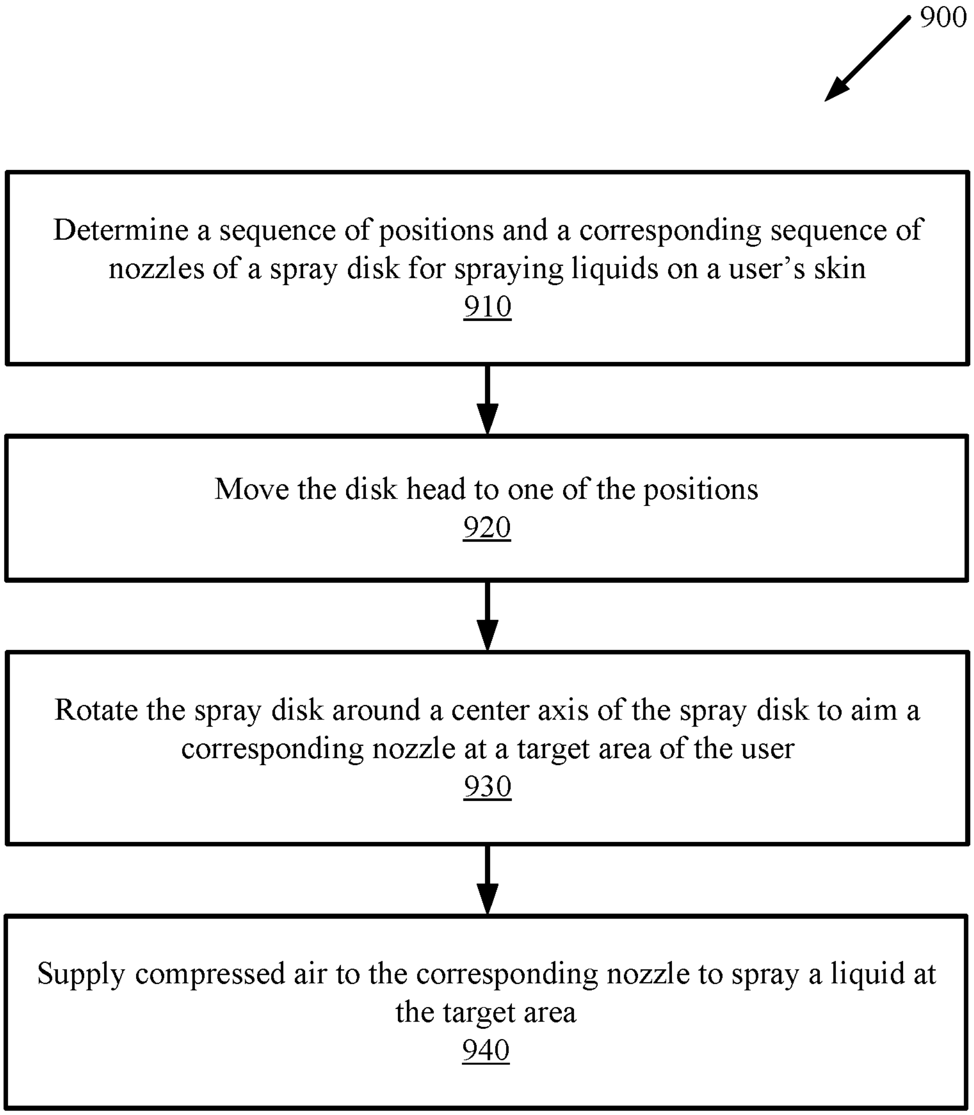
FIG. 9 is a flow diagram illustrating a method for performing automatic makeup operations according to one embodiment.

FIG. 9 is a flow diagram illustrating a method 900 performed by an automatic makeup machine to spray liquids contained in a multi-nozzle spray disk at a user according to one embodiment. A non-limiting example of the automatic makeup machine may include the machine 800 in FIG. 8. Non-limiting examples of the multi-nozzle spray disk may include the spray disk 100 (FIG. 1), 200 (FIG. 2), and 400 (FIG. 4), which may further include one or more components illustrated in FIGS. 3, 5, 6A, 6B, 7A, 7B, and 8. Referring also to FIG. 8, the steps of method 900 may be performed by the controller 810, or by components of the machine 800 under the control of the controller 810.

Method 900 starts at the beginning of an application session. At step 910, the machine determines a sequence of positions and a corresponding sequence of nozzles of a spray disk for spraying liquids on a user's skin. At step 920, the machine moves the disk head to one of the positions. At step 930, the machine rotates the spray disk around a center axis of the spray disk to aim a corresponding nozzle at a target area of the user's skin. At step 940, the machine supplies compressed air to the corresponding nozzle to spray a liquid at the target area.

Various functional components or blocks have been described herein. As will be appreciated by persons skilled in the art, the functional blocks will preferably be implemented through circuits (either dedicated circuits or general-purpose circuits, which operate under the control of one or more processors and coded instructions), which will typically comprise transistors that are configured in such a way as to control the operation of the circuitry in accordance with the functions and operations described herein.

While the invention has been described in terms of several embodiments, those skilled in the art will recognize that the invention is not limited to the embodiments described, and can be practiced with modification and alteration within the spirit and scope of the appended claims. The description is thus to be regarded as illustrative instead of limiting.

What is claimed is:

1. A spray disk comprising:

a plurality of nozzles at an outer perimeter of the spray disk, the nozzles pointing at respective radial directions away from a vertical axis; and a plurality of partitions arranged around a center hole that extends along a vertical axis, each partition including:

an air inlet at an inner perimeter that faces the vertical axis to receive compressed air, a liquid tank to store a liquid of a spray-on skin product, and a corresponding one of the nozzles from which to spray the liquid with the compressed air, wherein the spray disk when controlled by a machine, is caused by the machine to move to a sequence of positions and horizontally rotate around the vertical axis to aim a sequence of selected nozzles at a user's skin, one nozzle at a time, wherein each partition includes a top piece on top of the liquid tank, the top piece further includes the air inlet, the corresponding nozzle, and a siphon tube extending vertically downwards into the liquid tank, the air inlet splits into two air channels that are on a same horizontal plane as the air inlet to pass the compressed air to the corresponding nozzle, the siphon tube connects to a liquid channel that is on the same horizontal plane between the two air channels to pass the spray-on skin product to the corresponding nozzle.

2. The spray disk of claim 1, wherein each partition is a modularized partition that is separable from other partitions of the spray disk and is individually removable from the spray disk.

3. The spray disk of claim 2, wherein a surface of the modularized partition includes a machine-readable identifying code that identifies the liquid in the modularized partition.

4. The spray disk of claim 1, further comprising:

a machine-readable identifying code on a surface of the spray disk, wherein the machine-readable identifying code identifies a set of liquids in the spray disk.

5. The spray disk of claim 1, wherein each nozzle is formed by a liquid outlet from which a corresponding liquid exits the spray disk, and two or more air outlets from which the compressed air exits the spray disk, and wherein the corresponding liquid is mixed with the compressed air outside the spray disk.

6. The spray disk of claim 1, wherein each partition further includes an internal mixing chamber in which the compressed air is mixed with a corresponding liquid before reaching a corresponding nozzle.

7. The spray disk of claim 1, wherein each liquid tank is connected to a corresponding nozzle via a liquid channel, and wherein, before reaching the corresponding nozzle, the liquid channel splits into multiple paths of different sizes and each path is individually controlled to open or close.

8. The spray disk of claim 1, wherein the spray disk is coupled to a proximity sensor, which is operative to detect a distance between the spray disk and the user.

9. The spray disk of claim 1, further comprising:

a slit element coupled to a partition, the slit element including a slit positioned in front of a nozzle of the partition.

10. The spray disk of claim 1, further comprising:

an ultrasonic transducer attached to a bottom surface of the spray disk, the ultrasonic transducer operative to vibrate the spray disk.

11. The spray disk of claim 1, wherein the outer perimeter of the spray disk has a substantially circular shape.

12. The spray disk of claim 1, wherein the spray disk is made of one of: plastics, resin, glass, silicone, and metal.

13. The spray disk of claim 1, wherein each liquid is one of: a cosmetics product, a skincare product, a pharmaceutical skin product, and a dermatological product.

14. The spray disk of claim 1, wherein each partition is a modularized partition that is separable from other partitions of the spray disk and is individually removable from the spray disk, and wherein a surface of the modularized partition includes a machine-readable identifying code, which, when read by the machine, causes the machine to determine whether correct partitions are assembled into the spray disk for a selected makeup template.

15. The spray disk of claim 1, wherein a top surface of the liquid tank is covered by a film before use, the film being punctured by the siphon tube when the top piece is placed on the liquid tank.

16. A spray disk comprising:

a plurality of nozzles at an outer perimeter of the spray disk, the nozzles pointing at respective radial directions away from a vertical axis; and a plurality of partitions arranged around a center hole that extends along a vertical axis, each partition including:

an air inlet at an inner perimeter that faces the vertical axis to receive compressed air, a liquid tank at a bottom portion of the partition to store a liquid of a spray-on skin product, and a corresponding one of the nozzles from which to spray the liquid with the compressed air, wherein the spray disk when controlled by a machine, is caused by the machine to move to a sequence of positions and horizontally rotate around the vertical axis to aim a sequence of selected nozzles at a user's skin, one nozzle at a time, wherein each partition includes a top piece on top of the liquid tank, the top piece further includes the air inlet, the corresponding nozzle, and a siphon tube extending vertically downwards into the liquid tank, the air inlet splits into two air channels that are on a same horizontal plane as the air inlet to pass the compressed air to the corresponding nozzle, the siphon tube connects to a liquid channel that is on the same horizontal plane between the two air channels to pass the spray-on skin product to the corresponding nozzle, and wherein each partition is a modularized partition that is separable from other partitions of the spray disk and is individually removable from the spray disk.

17. The spray disk of claim 16, wherein a surface of the modularized partition includes a machine-readable identifying code, which, when read by the machine, causes the machine to determine whether correct partitions are assembled into the spray disk for a selected makeup template.

18. The spray disk of claim 16, wherein a surface of the modularized partition includes a machine-readable identifying code, which, when read by the machine, causes the machine to determine presence of counterfeiting.

19. The spray disk of claim 16, wherein the spray disk is coupled to a proximity sensor, which is operative to detect a distance between the spray disk and the user.

* * * * *